(12) United States Patent
Chang (10) Patent No.: US 10,882,178 B1
(45) Date of Patent: Jan. 5, 2021

(54) SANITARY TOOLS

(71) Applicant: Bill Chang, Friendswood, TX (US)

(72) Inventor: Bill Chang, Friendswood, TX (US)

( * ) Notice: Subject to any disclaimer, the term of this patent is extended or adjusted under 35 U.S.C. 154(b) by 0 days.

(21) Appl. No.: 16/854,713

(22) Filed: Apr. 21, 2020

Related U.S. Application Data (60) Provisional application No. 62/994,489, filed on Mar. 25, 2020.

(51) Int. Cl.
  *B08B 1/00* (2006.01)
  *B25J 1/04* (2006.01)
  *B08B 3/08* (2006.01)

(52) U.S. Cl.
  CPC .. *B25J 1/04* (2013.01); *B08B 3/08* (2013.01)

(58) Field of Classification Search
  CPC .................................. B25J 1/04; B08B 1/002
  USPC ......................................................... 422/292
  See application file for complete search history.

(56) References Cited

U.S. PATENT DOCUMENTS

| | | | |
|---|---|---|---|
| 2,247,003 A * | 6/1941 | Smith ................... | A45D 44/18 401/191 |
| 2,584,853 A | 2/1952 | Elsey | |
| 3,093,402 A | 6/1963 | Sisson | |
| 4,037,554 A | 7/1977 | Foscolo | |
| 5,181,757 A | 1/1993 | Montoya | |
| D348,186 S | 6/1994 | Wahl | |
| 5,619,758 A | 4/1997 | Burkett | |
| 7,080,427 B1 | 7/2006 | Campopiano | |
| 7,178,845 B1 | 2/2007 | Metzger | |
| 7,854,040 B1 | 12/2010 | Ramos | |
| 8,168,119 B1 * | 5/2012 | Bruno ..................... | A47L 25/00 134/4 |
| 10,036,415 B2 | 7/2018 | Yitzhaki | |
| 10,507,687 B1 * | 12/2019 | Hill, III ............... | B43K 24/163 |
| 2007/0084025 A1 | 4/2007 | Sparks | |
| 2010/0182738 A1 * | 7/2010 | Visser ................... | G06F 1/1613 361/679.01 |
| 2015/0205327 A1 * | 7/2015 | Daley, III ............ | G06F 1/1698 361/679.03 |
| 2016/0008501 A1 * | 1/2016 | Roberts ..................... | A61L 2/18 422/292 |
| 2019/0029405 A1 | 1/2019 | Kolb | |

FOREIGN PATENT DOCUMENTS

WO     WO2013017521 A2     2/2013

* cited by examiner

*Primary Examiner* — Kevin Joyner
(74) *Attorney, Agent, or Firm* — Elliott & Polasek, PLLC; Douglas H. Elliott; Nathan Q. Huynh (57) ABSTRACT

Disclosed herein are sanitary tools including a sanitary tool for opening a door, which sanitary tool may include: a housing: an arm capable of ingress into or egress from the housing, or both; and a cartridge removably coupled to the housing, the cartridge having a sanitizing portion capable of receiving sanitizing material and capable of being abutted against a portion of the arm.

28 Claims, 9 Drawing Sheets

SANITARY TOOLS

CROSS REFERENCE TO RELATED APPLICATIONS

This application claims benefit to U.S. Provisional Application No. 62/994,489, filed on Mar. 25, 2020; and this application hereby incorporates herein U.S. Provisional Application No. 62/994,489 as if set forth herein in its entirety.

BACKGROUND

1. Field of Inventions

The field of this application and any resulting patent is sanitary tools.

2. Description of Related Art

Various sanitary tools and methods for using sanitary tools have been proposed and utilized. However, those methods and structures lack the combination of steps and/or features of the methods and/or structures disclosed herein. Furthermore, it is contemplated that the methods and/or structures disclosed herein solve many of the problems that prior art methods and structures have failed to solve. Also, the methods and/or structures disclosed herein have benefits that would be surprising and unexpected to a hypothetical person of ordinary skill with knowledge of the prior art existing as of the filing date of this application.

SUMMARY

Disclosed herein are sanitary tools including a sanitary tool that may include: a housing; an arm capable of ingress into or egress from the housing, or both; and a cartridge removably coupled to the housing, the cartridge having a sanitizing portion, e.g., a sponge, capable of receiving sanitizing material and capable of being abutted against a portion of the arm.

Also disclosed herein are sanitary tools that may include: a housing having sidewalls, an interior, and an end portion that has an aperture: and a retractable arm with a distal portion and a proximate portion, wherein the arm may be capable of movement through the aperture from a first position to a second position, and wherein the distal portion may be in the interior of the housing in the first position and in the exterior of the housing in the second position, wherein the housing is configured to receive a cartridge that comprises absorbent material capable of holding sanitizing liquid, wherein the cartridge may be configured to be removably inserted into the interior of the housing, and wherein the cartridge would be capable of delivering the sanitizing liquid to at least a portion of the distal portion of the retractable arm when the retractable arm is in the second position. Certain embodiments may also include sanitary tools in which the housing, retractable arm, cartridge, and absorbent material are assembled, as illustrated in at least some of the drawings.

Further disclosed are sanitary tools that may include: a housing having sidewalls, an interior, and an end portion that has a first aperture; a retractable arm with a distal portion and a proximate portion, wherein the arm may be capable of movement through the aperture from a first position to a second position, and wherein the distal portion may be in the interior of the housing in the first position and in the exterior of the housing in the second position; and absorbent material, e.g., a sponge that may be affixed to the one or sidewalls of the housing, capable of holding sanitizing liquid, wherein the housing includes a second aperture through which sanitizing liquid is capable of being introduced to the interior of the housing so that the absorbent material can receive and absorb the sanitizing liquid; and wherein the absorbent material is capable of delivering the sanitizing liquid to at least a portion of the distal portion of the retractable arm when the retractable arm is in the second position.

Disclosed herein are methods of sanitary contacting, which methods may include the steps of: providing a sanitary tool, comprising: a housing; and an arm coupled to the housing; and a cartridge having a sanitizing portion disposed in the housing; sliding an arm portion of the arm across the sanitizing portion; sanitizing the arm portion against the sanitizing portion; and abutting the sanitized arm portion against a surface.

Disclosed herein are methods of sanitary contacting, which method may include the steps of: providing a sanitary tool, comprising: a housing; and an arm coupled to the housing; and a cartridge having a sanitizing portion disposed in the housing; sliding a first finger and a second finger of the arm across the sanitizing portion; sanitizing the first finger and the second finger with the sanitizing portion; pushing a handle of a door with the sanitized first finger; and pulling the handle with the sanitized second finger.

DETAILED DESCRIPTION

1. Introduction

A detailed description will now be provided. The purpose of this detailed description, which includes the drawings, is to satisfy the statutory requirements of 35 U.S.C. § 112. For example, the detailed description includes a description of inventions defined by the claims and sufficient information that would enable a person having ordinary skill in the art to make and use the inventions. In the figures, like elements are generally indicated by like reference numerals regardless of the view or figure in which the elements appear. The figures are intended to assist the description and to provide a visual representation of certain aspects of the subject matter described herein. The figures are not all necessarily drawn to scale, nor do they show all the structural details, nor do they limit the scope of the claims.

Each of the appended claims defines a separate invention which, for infringement purposes, is recognized as including equivalents of the various elements or limitations specified in the claims. Depending on the context, all references below to the "invention" may in some cases refer to certain specific embodiments only. In other cases, it will be recognized that references to the "invention" will refer to the subject matter recited in one or more, but not necessarily all, of the claims. Each of the inventions will now be described in greater detail below, including specific embodiments, versions, and examples, but the inventions are not limited to these specific embodiments, versions, or examples, which are included to enable a person having ordinary skill in the art to make and use the inventions when the information in this patent is combined with available information and technology. Various terms as used herein are defined below, and the definitions should be adopted when construing the claims that include those terms, except to the extent a different meaning is given within the specification or in express representations to the Patent and Trademark Office (PTO). To the extent a term used in a claim is not defined below or in representations to the PTO, it should be given the broadest definition persons having skill in the art have given that term as reflected in at least one printed publication, dictionary, or issued patent.

2. Selected Definitions

Certain claims include one or more of the following terms which, as used herein, are expressly defined below.

The term "adjacent" as used herein means next to and may include physical contact but does not require physical contact.

The term "abut against" as used herein as a verb is defined as position adjacent to and either physically touch or press against, directly or indirectly. After any abutting takes place with one object relative to another object, the objects may be fully or partially "abutted." A first object may be abutted against a second object such that the second object is limited from moving in a direction of the first object. For example, a portion of a sponge may be abutted against a surface of an arm or finger.

The term "aligning" as used herein is a verb that means manufacturing, forming, adjusting, or arranging one or more physical objects into a particular position. After any aligning takes place, the objects may be fully or partially "aligned." "Aligning preferably involves arranging a structure or surface of a structure in linear relation to another structure or surface; for example, such that their borders or perimeters may share a set of parallel tangential lines. In certain instances, the aligned borders or perimeters may share a similar profile. Additionally, apertures may be aligned, such that a structure or portion of a structure may be extended into and/or through the apertures.

The term "aperture" as used herein is defined as any opening in a solid surface or object including a structure such as a housing and/or a housing portion. For example, an aperture may be a three-dimensional opening that begins on one side of a solid object and ends on the other side of the object, e.g., the space inside a housing, or an aperture passing through a housing wall in which is disposed a bearing. An aperture may alternatively be an opening that does not pass entirely through an object, but only partially passes through, e.g., as a groove. An aperture can be an opening in an object that is completely circumscribed, defined, or delimited by the object itself. Alternatively, an aperture can be an opening formed when one object is combined with one or more other objects or structures. An aperture may receive an object, e.g., housing, lock sleeve, lock, shaft, or bearing.

The term "arm" as used herein is defined as any fully solid or partially solid structure configured, sized, and/or shaped for pushing and/or pulling an object, e.g., button, door, and/or handle. An arm may have a length and a width and may also have a height, in which the length preferably has a distance greater than either the width or height. An arm may include a portion that has a cross-section that is cylindrical or rectangular or some other geometric shape. When a device includes an arm and a housing, that arm may have a proximal portion which is the portion closest to the housing, and which is preferably fully or partially within the housing, when the arm is in an actuated configuration, and a distal portion which is the portion farthest from the housing when the arm is in a sanitizing configuration, and which may include a proximal end. An arm may have one or more fingers extending therefrom. An arm may have a finger removably coupled to the arm. An arm may be retracted into a housing vie sliding or rotating relative to the housing.

The term "assembly" as used herein is defined as any set of components that have been fully or partially assembled together. A group of assemblies may be coupled to form a larger assembly.

The term "coupled" as used herein is defined as directly or indirectly connected or attached. A first object may be coupled to a second object such that the first object is positioned at a specific location and orientation with respect to the second object. For example, a motor may be coupled to a cutter assembly. A first object may be either permanently, removably, slidably, and/or rotatably coupled to a second object. Two objects are "permanently coupled," if once they are coupled, the two objects, in some cases, cannot be separated. Two objects may be "removably coupled" to each other via shear pins, threads, tape, latches, hooks, fasteners, locks, male and female connectors, clips, clamps, knots, and/or surface-to-surface contact. For example, a cartridge and a housing may be removably coupled to each other such that the cartridge may then be uncoupled and removed from the housing. Two objects may be "slidably coupled" where an inner aperture of one object is capable of receiving a second object. For example, arm disposed in a housing may be slidably coupled to tracks of the housing. Additionally, two objects may be capable of being "rotatably coupled," e.g., where one object is capable of being rotated, swiveled, and/or pivoted relative to the other object. For example, a flap may be rotatably coupled to a housing where the flap, in some cases, may be rotated relative to the housing. Additionally, an arm may be rotatably coupled to a housing where the arm, in some cases, may be rotated relative to the housing.

The terms "first" and "second" as used herein merely differentiate two or more things or actions, and do not signify anything else, including order of importance, sequence, etc.

The term "housing" as used herein is defined as any fully solid or partially solid structure that can receive objects or structures and has walls and space inside with room for some other structure, preferably multiple structures including an arm, a cartridge, a sponge, and other components as shown in the drawings herein. A housing is preferably hollow. A housing may be formed from two housing portions (see 102a, 102b, FIG. 1). A housing may have apertures formed from aligned grooves in housing portions.

The term "latch" as used herein as a noun is defined as any fully solid or partially solid structure configured, sized, and/or shaped for inhibiting movement of an arm. A latch may have a portion removably abutted against an arm. A latch may have a portion abutted against a housing portion. A latch may be rotatably coupled to a housing portion.

The term "perpendicular" as used herein is defined as at an angle ranging from 85° or 88 to 92° or 95°. Two structures that are perpendicular to each other may be orthogonal and/or tangential to each other.

The term "providing" as used herein is defined as making available, furnishing, supplying, equipping, or causing to be placed in position.

The term "sponge" as used herein is defined as any absorbent material, man-made and/or natural, including an absorbent structure that is capable of absorbing liquid. Preferably, a sponge is an elastic porous structure that is capable of receiving and holding liquid when that liquid contacts the surface of the structure. At least one type of sponge material is an elastic porous mass of interlacing fibers that forms the internal skeleton of various marine animals and is capable when wetted to absorb water. A sponge may be disposed in a housing.

The term "flap" includes any solid structure that when disposed next to or within an aperture can be configured in various positions including an open position so that the aperture is open and a closed position so that the aperture is closed. As illustrated in the exemplary drawings herein, a housing may have an aperture with two rigid flaps that swing or rotate between open and closed positions. An alternative embodiment (not shown) may have a single rigid flap that swings open or closed in a door-like or gate-like fashion. In yet another embodiment (not shown), the flap may be a flexible material that does not swing but rather has a closeable aperture with a valve assembly such that an arm may push through the aperture when the aperture is in an open position and the arm is on the outside of the housing, and then when the arm is brought back into the housing, the aperture is in a closed position, e.g., the valve assembly closes in such a way that a seal is formed and any liquid is prevented from escaping from the housing.

The term "surface" as used herein is defined as any face and/or boundary of a structure. A surface may also refer to that flat or substantially flat area that is extended across a flat structure which may, for example, be part of a plate and an arm. A surface may also refer to any curved area that extends circumferentially around a cylindrical structure or object which may, for example, be part of an arm and/or a rib. A surface may have irregular contours. A surface may be formed from coupled components, e.g. a housing portion, an arm, a finger, a cartridge, and/or a sponge. Coupled components may form irregular surfaces. A plurality of surfaces may be connected to form a polygonal cross-section. An example of a polygonal cross-section may be triangular, square, rectangular, pentagonal, hexagonal, or octagonal. Socket surfaces may have socket surfaces connected to form a polygonal shape, e.g., triangular, square, rectangular, pentagonal, hexagonal, or octagonal.

The term "unitary" as used herein defined as having the form of a single unit.

The terms "upper," "lower," "top," "bottom" as used herein are relative terms describing the position of one object, thing, or point positioned in its intended useful position, relative to some other object, thing, or point also positioned in its intended useful position, when the objects, things, or points are compared to distance from the center of the earth. The term "upper" or "top" identifies any object or part of a particular object that is farther away from the center of the earth than some other object or part of that particular object, when the objects are positioned in their intended useful positions. The term "lower" or "bottom" identifies any object or part of a particular object that is closer to the center of the earth than some other object or part of that particular object, when the objects are positioned in their intended useful positions.

3. Certain Specific Embodiments

Disclosed herein are sanitary tools including sanitary tools that may include: a housing; an arm capable of ingress into or egress from the housing, or both; and a cartridge removably coupled to the housing, the cartridge having a sanitizing portion capable of receiving sanitizing material and capable of being abutted against a portion of the arm.

Disclosed herein are sanitary tools that may include: a housing having sidewalls, an interior, and an end portion that has an aperture; a retractable arm with a distal portion and a proximate portion, wherein the arm may be capable of movement through the aperture from a first position to a second position, and wherein the distal portion may be in the interior of the housing in the first position and in the exterior of the housing in the second position; and a cartridge that comprises absorbent material capable of holding sanitizing liquid, wherein the cartridge may be configured to be removably inserted into the interior of the housing, and wherein the cartridge would be capable of delivering the sanitizing liquid to at least a portion of the distal portion of the retractable arm when the retractable arm is in the second position.

Further disclosed are sanitary tools that may include: a housing having sidewalls, an interior, and an end portion that has a first aperture; a retractable arm with a distal portion and a proximate portion, wherein the arm may be capable of movement through the aperture from a first position to a second position, and wherein the distal portion may be in the interior of the housing in the first position and in the exterior of the housing in the second position; and absorbent material, e.g., a sponge that may be affixed to the one or sidewalls of the housing, capable of holding sanitizing liquid, wherein the housing includes a second aperture through which sanitizing liquid is capable of being introduced to the interior of the housing so that the absorbent material can receive and absorb the sanitizing liquid; and wherein the absorbent material is capable of delivering the sanitizing liquid to at least a portion of the distal portion of the retractable arm when the retractable arm is in the second position.

Additionally disclosed are methods of sanitary contacting, which methods may include the steps of: providing a sanitary tool, comprising: a housing; and an arm coupled to the housing; and a cartridge having a sanitizing portion disposed in the housing; sliding an arm portion of the arm across the sanitizing portion; sanitizing the arm portion against the sanitizing portion; and abutting the sanitized arm portion against a surface.

Also disclosed herein are methods of sanitary contacting, which methods may include the steps of: providing a sanitary tool, comprising: a housing; and an arm coupled to the housing; and a cartridge having a sanitizing portion disposed in the housing; sliding a first finger and a second finger of the arm across the sanitizing portion; sanitizing the first finger and the second finger with the sanitizing portion; pushing a handle of a door with the sanitized first finger; and pulling the handle with the sanitized second finger.

In any one of the methods or structures disclosed herein, the housing may include: a first track slidably coupled to the arm; and a second track slidably coupled to the arm.

In any one of the methods or structures disclosed herein, the housing may include a track slidably coupled to the cartridge.

In any one of the methods or structures disclosed herein, the arm may include a finger capable of pulling a door handle on a door.

In any one of the methods or structures disclosed herein, the arm may include a finger capable of pushing a surface.

In any one of the methods or structures disclosed herein, the sanitizing portion may be capable of physical contact with a portion of the arm.

In any one of the methods or structures disclosed herein, the sanitizing portion may be capable of brushing against a portion of the arm.

In any one of the methods or structures disclosed herein, the sanitizing portion may include a sponge.

In any one of the methods or structures disclosed herein, the sanitizing portion may include a brush.

In any one of the methods or structures disclosed herein, the absorbent material may include a sponge.

In any one of the methods or structures disclosed herein, the absorbent material may include a brush.

In any one of the methods or structures disclosed herein, the cartridge may further be capable of receiving a sanitizing fluid.

In any one of the methods or structures disclosed herein, the cartridge may be removably coupled to the housing.

In any one of the methods or structures disclosed herein, the arm may be rotatably coupled to the housing.

In any one of the methods or structures disclosed herein, the arm is capable of rotating 180 degrees relative to the housing.

Any one of the methods or structures disclosed herein may further include a latch coupled to the housing and the arm.

Any one of the methods or structures disclosed herein may further include a latch having first portion coupled to the housing and a second portion removably coupled to the arm.

Any one of the methods disclosed herein may further include abutting the sanitized arm portion against a handle of a door.

Any one of the methods disclosed herein may further include rotating the arm out of the housing.

Any one of the methods disclosed herein may further include rotating the arm into the housing.

Any one of the methods disclosed herein may further include biasing the arm towards an opening of the housing.

Any one of the methods disclosed herein may further include pushing the handle with the sanitized arm portion.

Any one of the methods disclosed herein may further include pulling the handle with the sanitized arm portion.

Any one of the methods disclosed herein may further include sliding the arm out of the housing.

Any one of the methods disclosed herein may further include sliding the arm into the housing.

Any one of the methods disclosed herein may further include abutting a portion of the arm against a protrusion of the housing.

Any one of the methods disclosed herein may further include disposing sanitizing material from the cartridge onto the arm portion.

Any one of the methods disclosed herein may further include brushing sanitizing material from the cartridge onto the arm portion.

Any one of the methods disclosed herein may further include wiping the arm portion with the sanitizing portion.

Any one of the methods disclosed herein may further include pivoting flaps to open an opening of the housing.

Any one of the methods disclosed herein may further include pivoting flaps to close and opening of a housing.

4. Specific Embodiments in the Drawings

The drawings presented herein are for illustrative purposes only and do not limit the scope of the disclosure. Rather, the drawings are intended to help enable one having ordinary skill in the art to make and use the assemblies disclosed herein.

This section addresses specific versions of sanitary tools shown in the drawings, which relate to assemblies, elements and parts that can be part of a sanitary tool. Although this section focuses on the drawings herein, and the specific embodiments found in those drawings, parts of this section may also have applicability to other embodiments not shown in the drawings. The limitations referenced in this section should not be used to limit the scope of the claims themselves, which have broader applicability.

Figure 1:
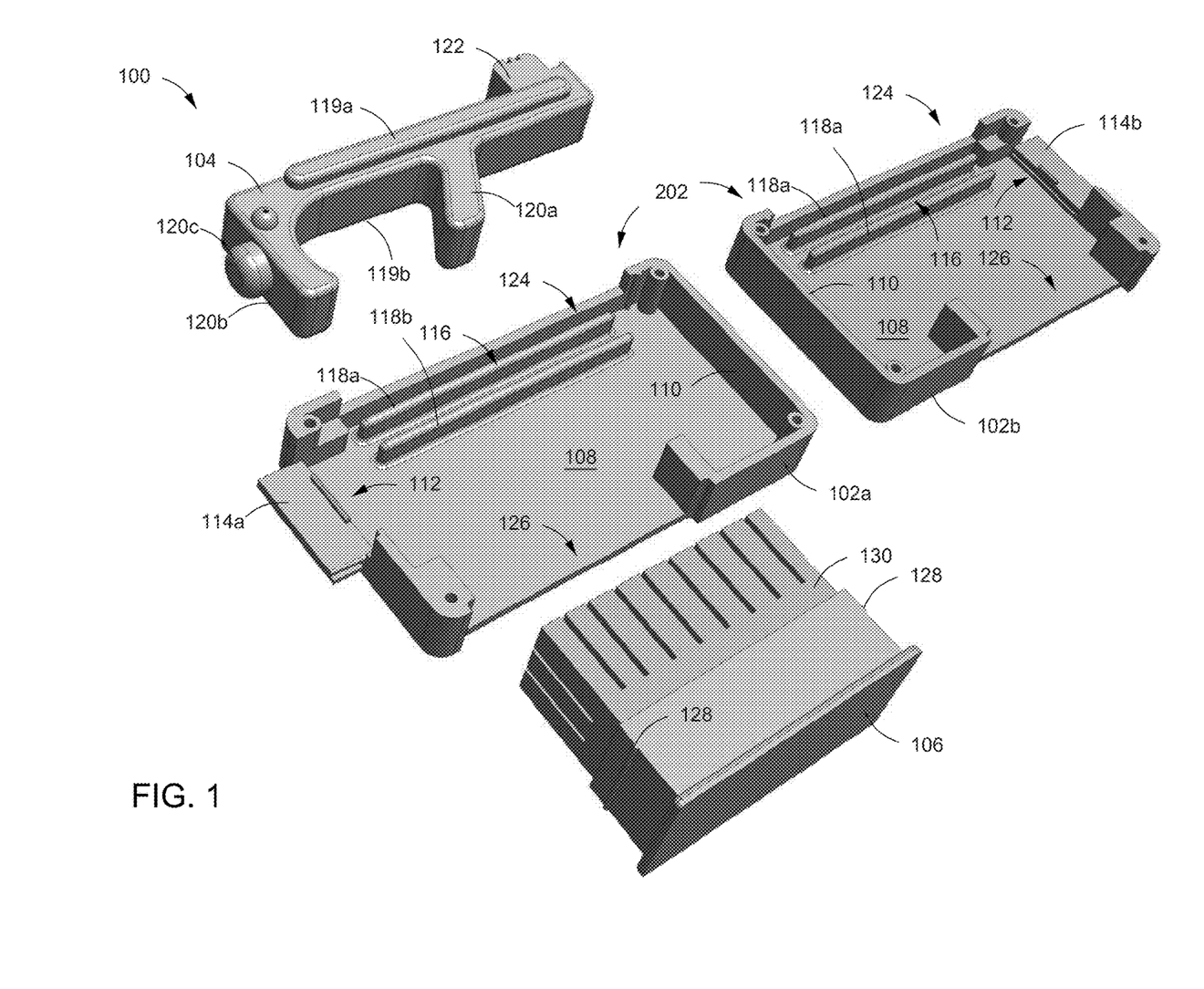
FIG. 1 illustrates a perspective exploded view of a sanitary tool.
Figure 2:
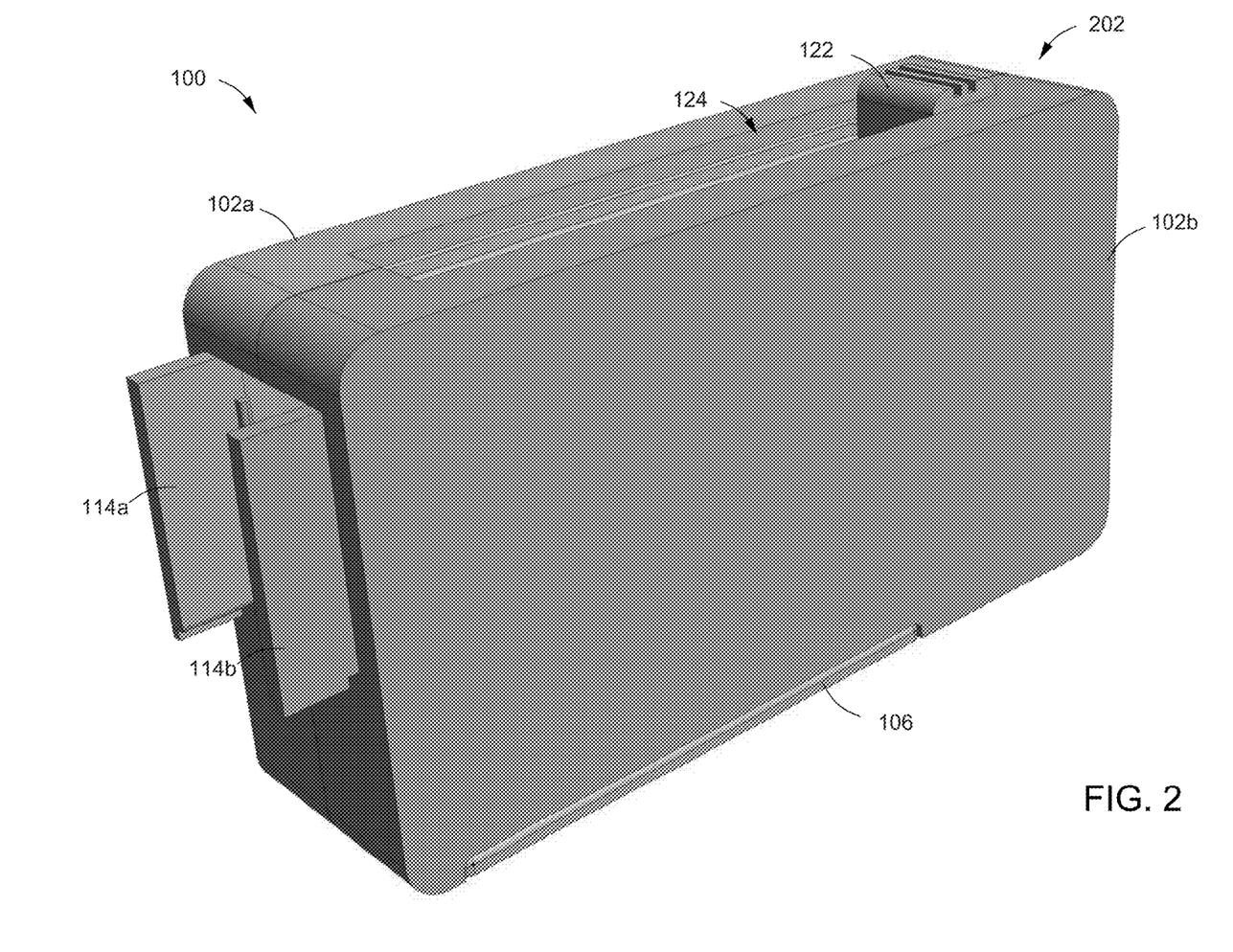
FIG. 2 illustrates a perspective view of an assembled sanitary tool.

FIG. 1 illustrates a perspective exploded view of a sanitary tool 100. FIG. 2 illustrates a perspective view of an assembled sanitary tool 100.

Referring to FIG. 1 and FIG. 2, a sanitary tool 100 includes a first housing portion 102a and a second housing portion 102b, an arm 104, and a cartridge 106. The first housing portion 102a and the second housing portion 102b are configured, sized, and/or shaped to be mirrors of each other. Thus, the first housing portion 102a and the second housing portion 102b may be coupled, e.g., via screws, to each to form a housing 202 that is bilaterally symmetrical (see FIG. 2).

Each housing portion 102 has a rectangular base 108 and a sidewall 110 extending from the base 108. The base 108 is planar. The sidewall 110 extends perpendicular to the base 108.

The sidewall 110 of each housing portion 102 has a flap opening 112. The flap opening 112 has a flap 114 disposed therein. The flap 114 is rotatably coupled to the sidewall 110. Accordingly, the flap 114 may have a portion rotated out of the flap opening 112. When the flap 114 is disposed in the flap opening 112, a surface of the flap 114 and a surface of the sidewall 110 would be coplanar.

In addition, the sidewall 110 of each housing portion 102 has a track 116. The track 116 is formed from two ribs 118a, 118b protruding from an inner surface of the sidewall 110. The ribs 118a, 118b extend parallel to each other. Also, the ribs 118a, 118b extend in a direction towards the flap opening 112. Moreover, the ribs 118a, 118b are configured, sized, and/or shaped so an arm rib 119 of the arm 104 may be disposed between the ribs 118a, 118b. The arm rib 119 may be slid along the ribs 118a, 118b. Thus, the arm 104 is slidably coupled to the housing portion 102.

Arm ribs 119a, 119b protrude on opposite sides of the arm 104. Because the ribs 118a, 118b extend parallel in a direction towards the flap opening 112, a portion of the arm 104 is slidable through the flap opening 112.

Additionally, the arm 104 has a first finger 120a and a second finger 120b extending below the arm ribs 119a, 119b. The first finger 120a and the second finger 120b extend obtusely relative to the arm ribs 119a, 119b. Also, the arm has a third finger 120c extending in a direction parallel to the arm ribs 119a, 119b. The third finger 120c can be removably coupled to the arm 104.

The arm 104 has an actuation button 122 extending above the ribs 118a, 118b. The action actuation button 122 is disposed in a button groove 124 of the sidewall 110 of each housing portion 102. The actuation button 122 may be slid back or forth, or both, in the button groove 124.

Figure 3A:
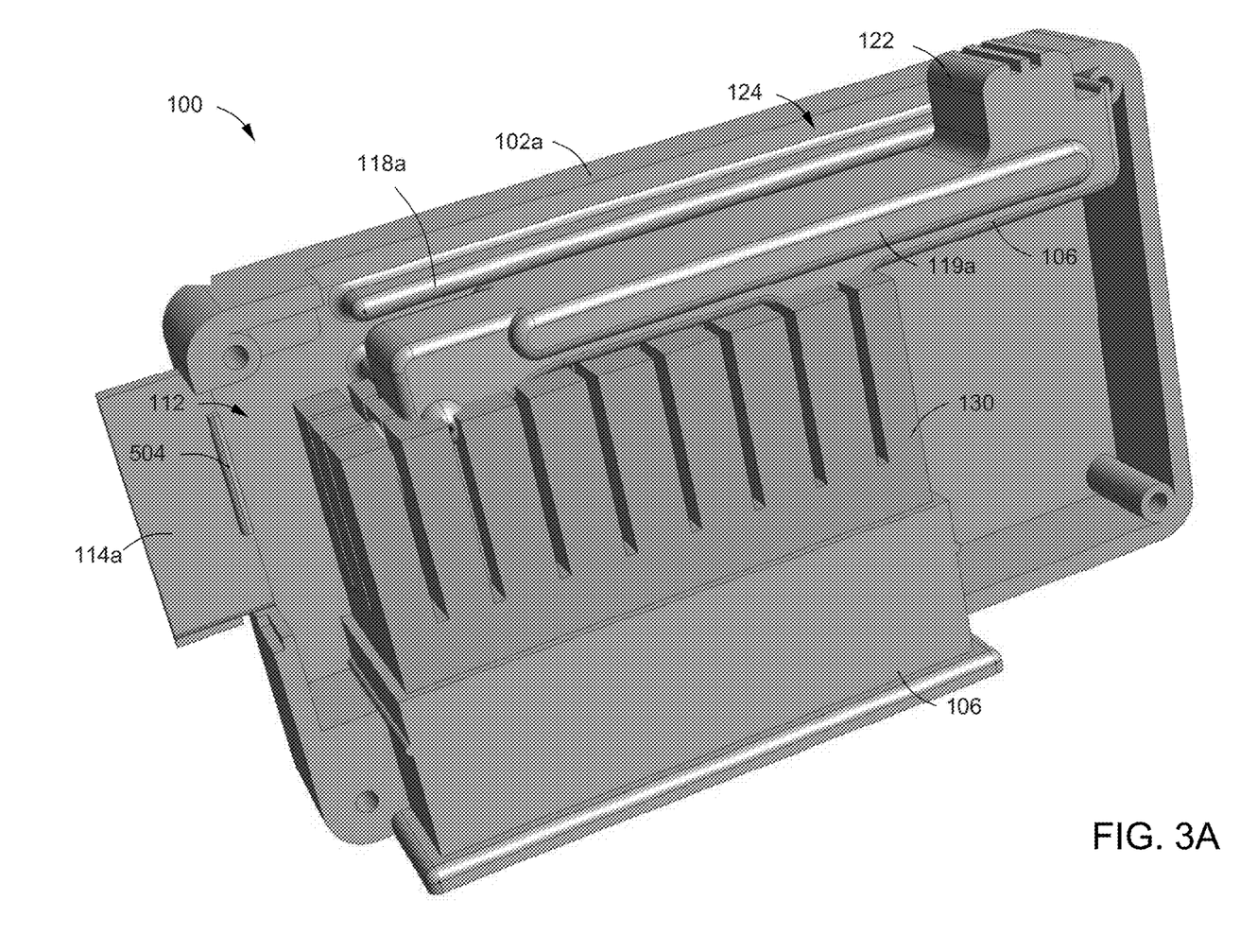
FIG. 3A illustrates a perspective view a partially assembled sanitary tool in a sanitizing configuration.

Also, the sidewall 110 of each housing portion 102 include a cartridge groove 126. The cartridge groove 126 is configured, sized, and/or shaped to receive a portion of the cartridge 106. The cartridge 106 has a base and a sidewall extending from the base. The sidewall of the cartridge 106 has protrusions 128 that may be abutted against the portions of the sidewall 110 of each of the housing portion 102 (see FIG. 3). When the protrusions 128 are abutted against the portions of the sidewall 110, in some cases, the cartridge 106 may be in inhibited from egress from the cartridge groove 126.

A sponge 130 may be disposed in the cartridge 106. One or more portions of the sponge 130 may extend from the cartridge 106. When the arm 104 is slid back or forth, one or more portions of the arm 104, e.g., fingers 120a-c, may be in physical contact with the one or portions of the sponge 130.

Figure 3B:
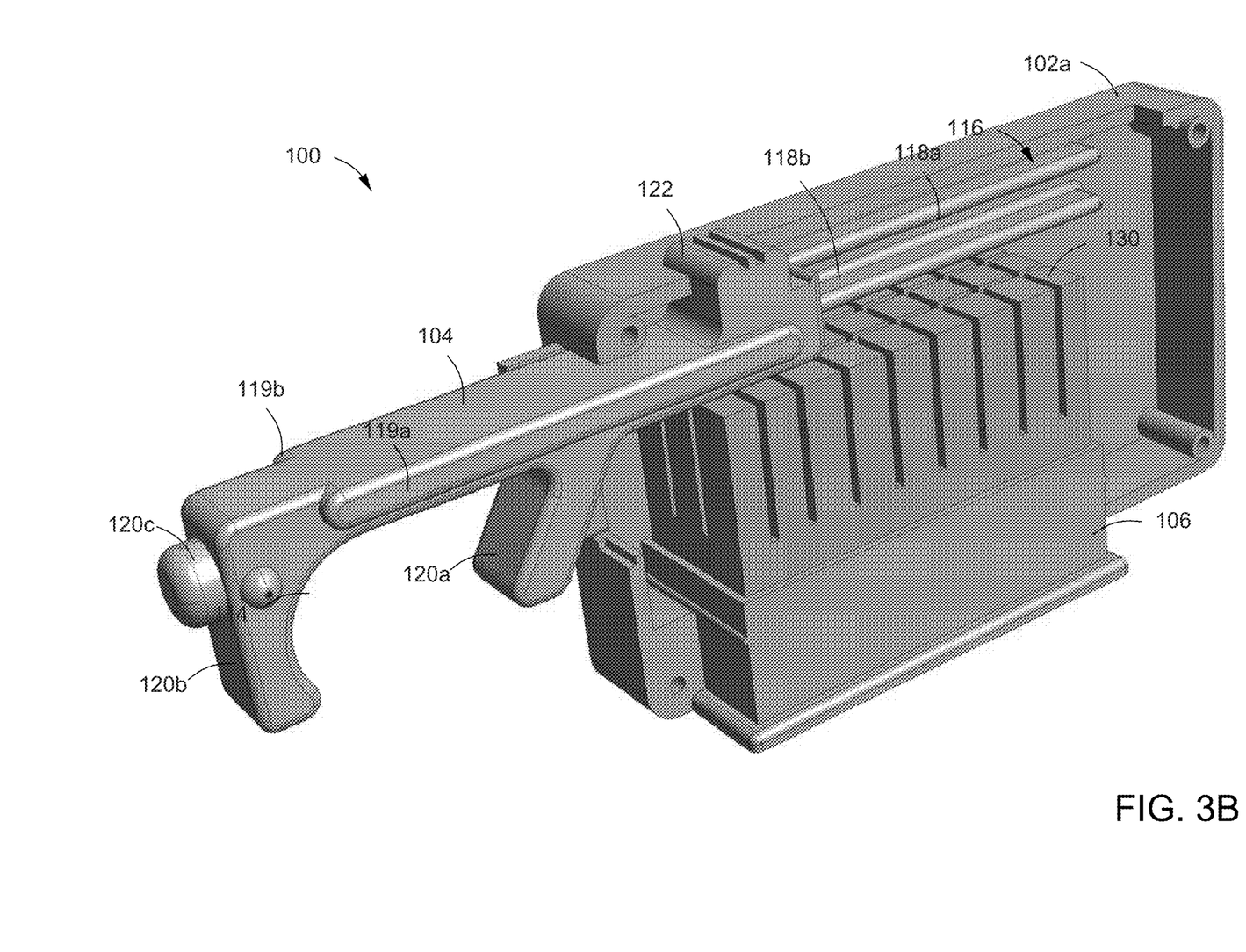
FIG. 3B illustrates a perspective view a partially assembled sanitary tool in an actuated configuration.

FIG. 3A illustrates a perspective view of a partially assembled sanitary tool 100 in a sanitizing configuration, which may also be a sanitized configuration to the extent the sanitizing has been accomplished, e.g., by liquid absorbed in the sponge being transmitted in a sufficient amount to the arm. In the sanitizing or sanitized configuration, portions of the arm 104 are disposed inside a housing 202. Those portions of the arm 104 are in physical contact with portions of a sponge 130 of a cartridge 106. For example, fingers 120a-c of the arm 104 are in physical contact with the portions of the sponge 130. As illustrated in FIG. 3A and FIG. 3B, the sponge 130 may include individual fingers that are elongated, in the sense, they have a length that is more than twice their width. The individual fingers of the sponge 130 protrude in a direction that is perpendicular to the path of the arm 104 when it is moved from a position inside the housing 202 to a position outside the housing 202. The individual fingers collectively surround the arm 104 when the arm 104 is in the sanitizing configuration and in that configuration the sponge fingers that are adjacent the arm provide transmission of sanitizing liquid to the arm 104. However, because the fingers are individually flexible they may bend easily so that the arm 104 can easily push past them when moved from a position inside the housing 202 to a position outside the housing 202.

FIG. 3B illustrates a perspective view of a partially assembled sanitary tool 100 in an actuated configuration. In the actuated configuration, fingers 120a-c of the arm 104 are disposed outside a housing 202.

Sanitizing material, e.g. soap, alcohol, hydrogen peroxide, antiseptic, sanitizing fluid, and/or water, may be disposed within the housing 202, preferably in the cartridge 106. The sanitizing material may be disposed within the housing 202 via the cartridge 106 that includes a sponge 130 when the sanitizing material is in physical contact with the sponge 130. Accordingly, the sanitizing material may soak into the sponge 130. Moreover, the sanitizing material may be distributed throughout the sponge 130. Because the sponge 130 may have portions in physical contact with portions of the arm 104, some of the sanitizing material in the sponge 130 may be deposited onto the portions of the arm 104. Thus, the sanitizing material may sanitize the portions of the arm 104.

Figure 4:
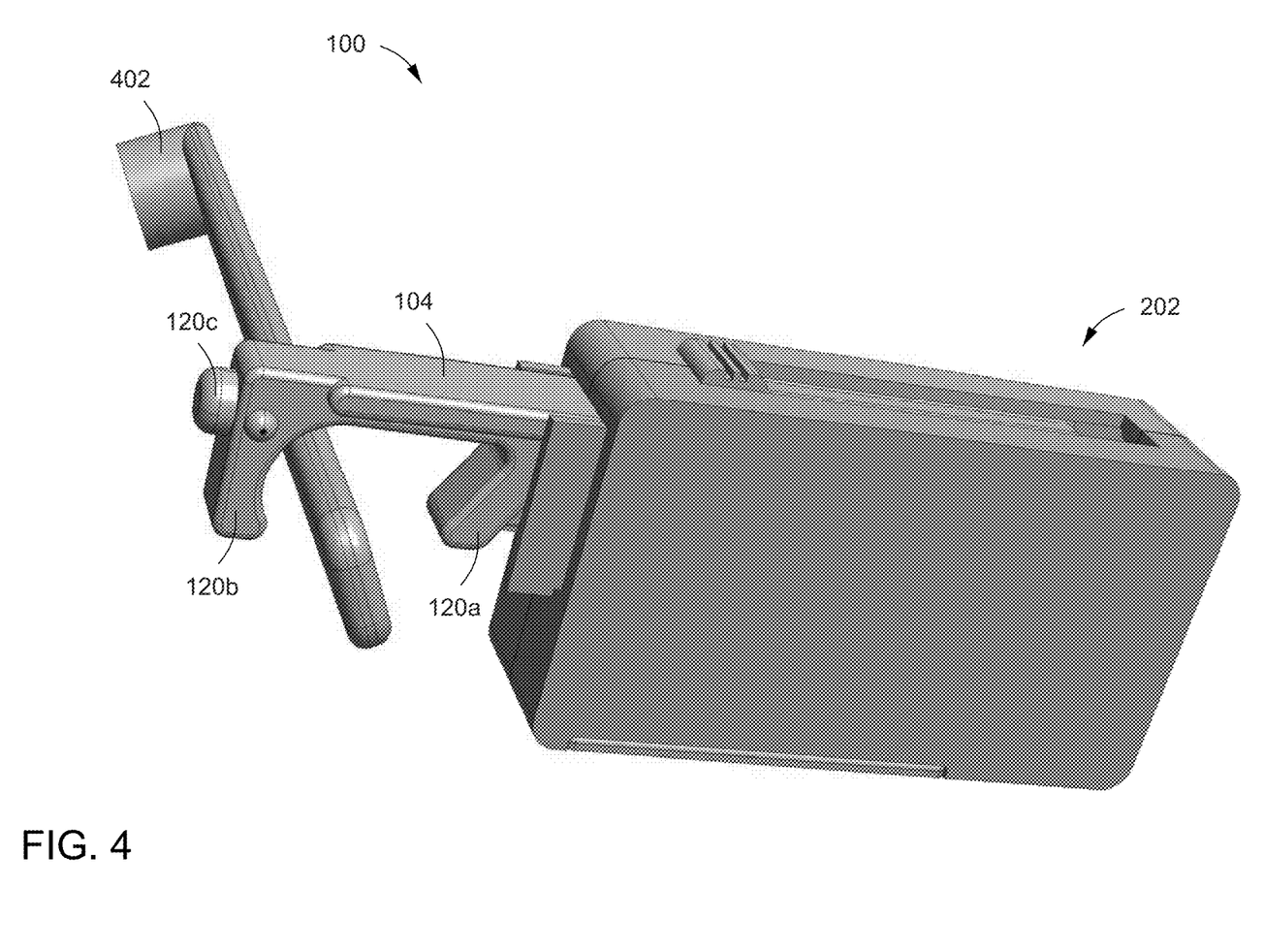
FIG. 4 illustrates a perspective view a sanitary tool in an actuated configuration disposed adjacent a door handle.

FIG. 4 illustrates a perspective view a sanitary tool 100 in an actuated configuration disposed adjacent a door handle 402. In the actuated configuration, the arm 104 have fingers 120a-c disposed outside a housing 202. The finger 120b is abutted against the handle 402 so an operator holding the sanitary tool 100 can pull the handle 402 with the finger 120b.

Figure 5:
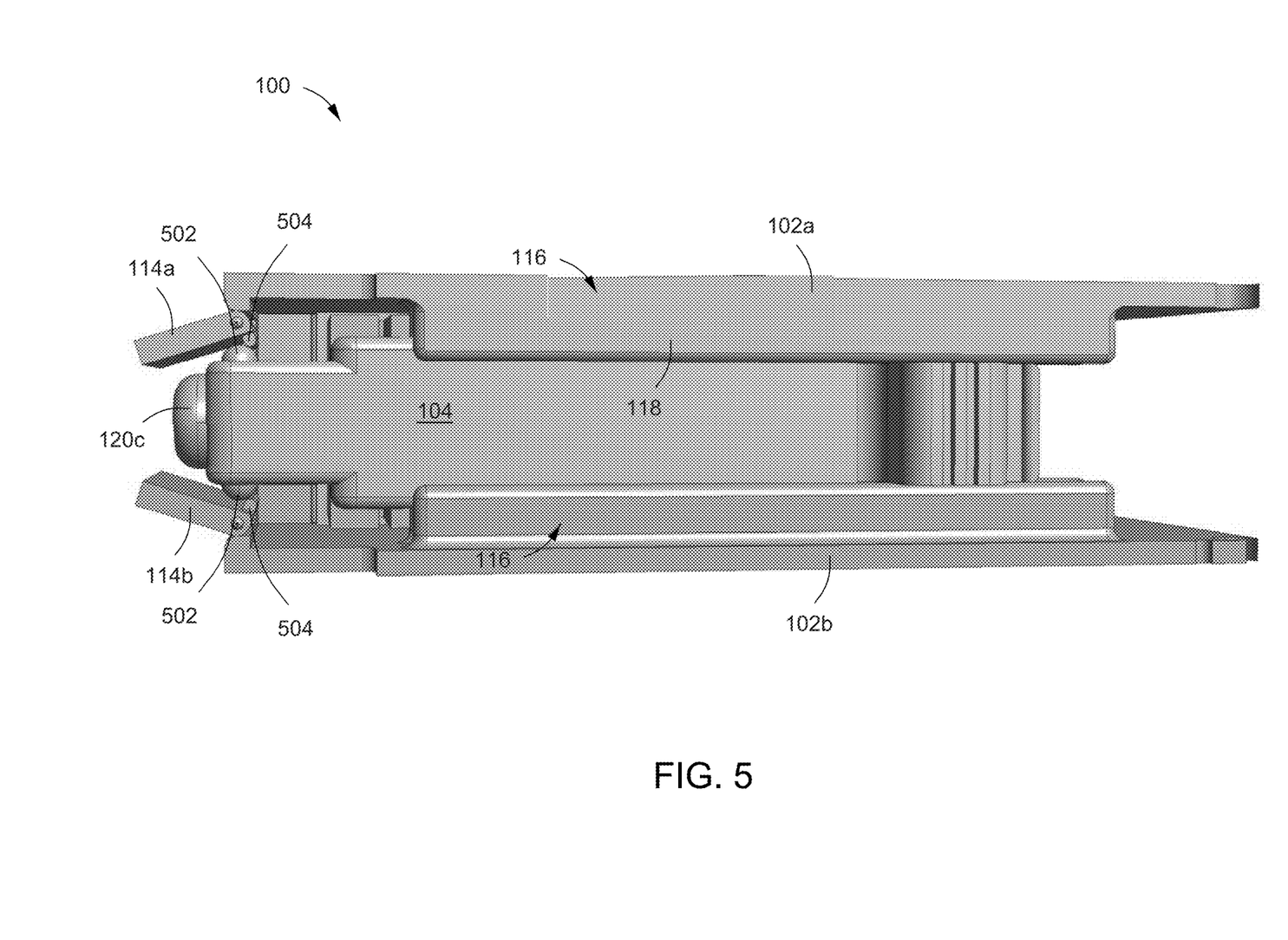
FIG. 5 illustrates a cross-cut perspective view of knobs on an arm pushing flap protrusions of flaps.

FIG. 5 illustrates a cross-cut perspective view of knobs 502 on an arm 104 pushing flap protrusions 504 of flaps 114a, 114b. Each flap 114 is rotatably coupled to a housing portion 102 (see FIG. 2). When pushed by the knobs 502, the flap protrusion 504 would cause the respective flap 114 to rotate, e.g., swivel and/or pivot, relative to the housing portion 102. The flaps 114a, 114b would be rotated to a closed configuration, in which the flaps 114a, 114b have surfaces coplanar with surfaces of sidewalls 110 of the housing portion 102a, 102b. Accordingly, the closed flaps may, in some cases, inhibit debris and germs from entering the housing 102. Moreover, the closed flaps 114a, 114b may, in some cases, inhibit evaporation of sanitizing fluid disposed in a cartridge 106 disposed in the housing 102.

Figure 6:
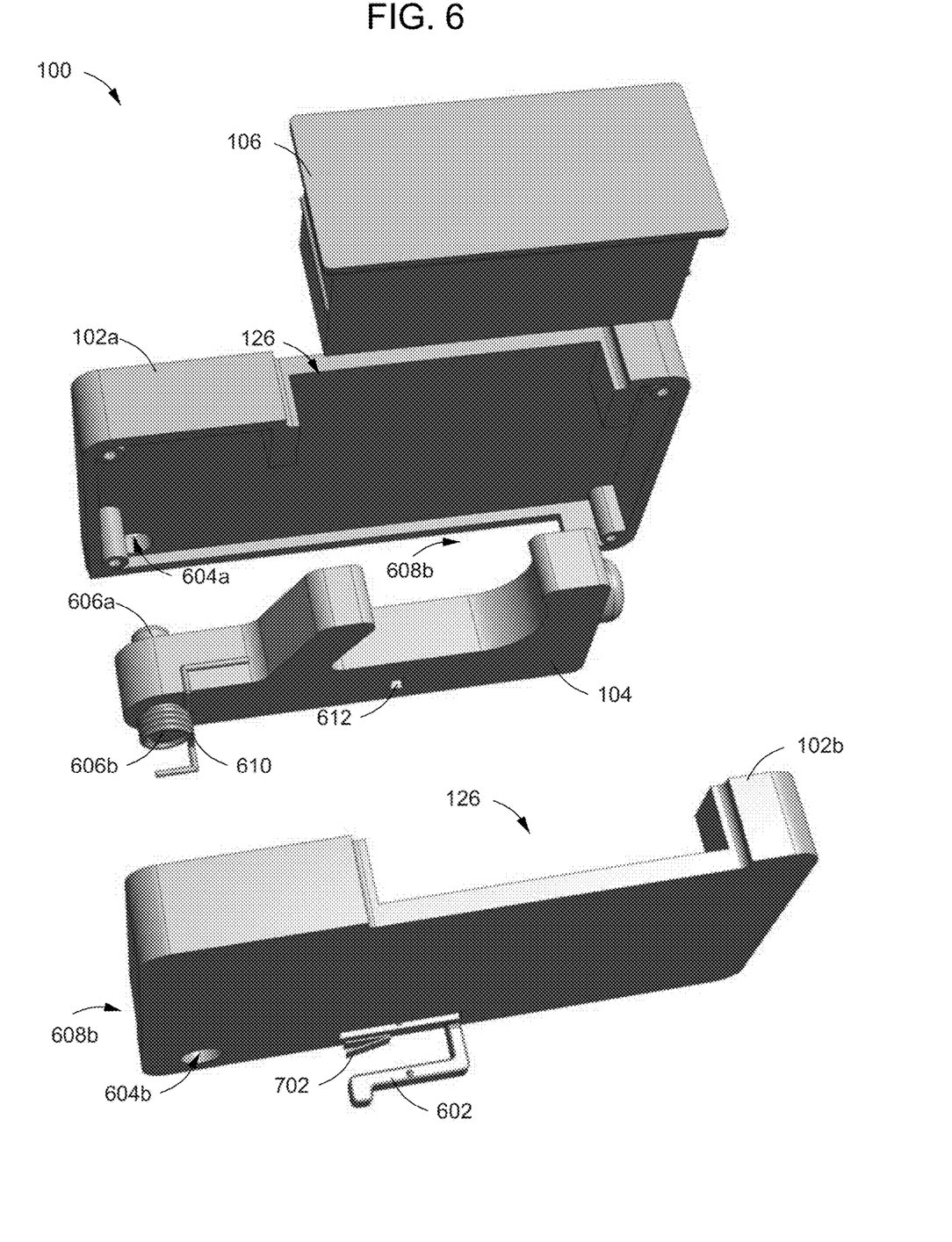
FIG. 6 illustrates a perspective exploded view of a sanitary tool having a rotatable arm.
Figure 7A:
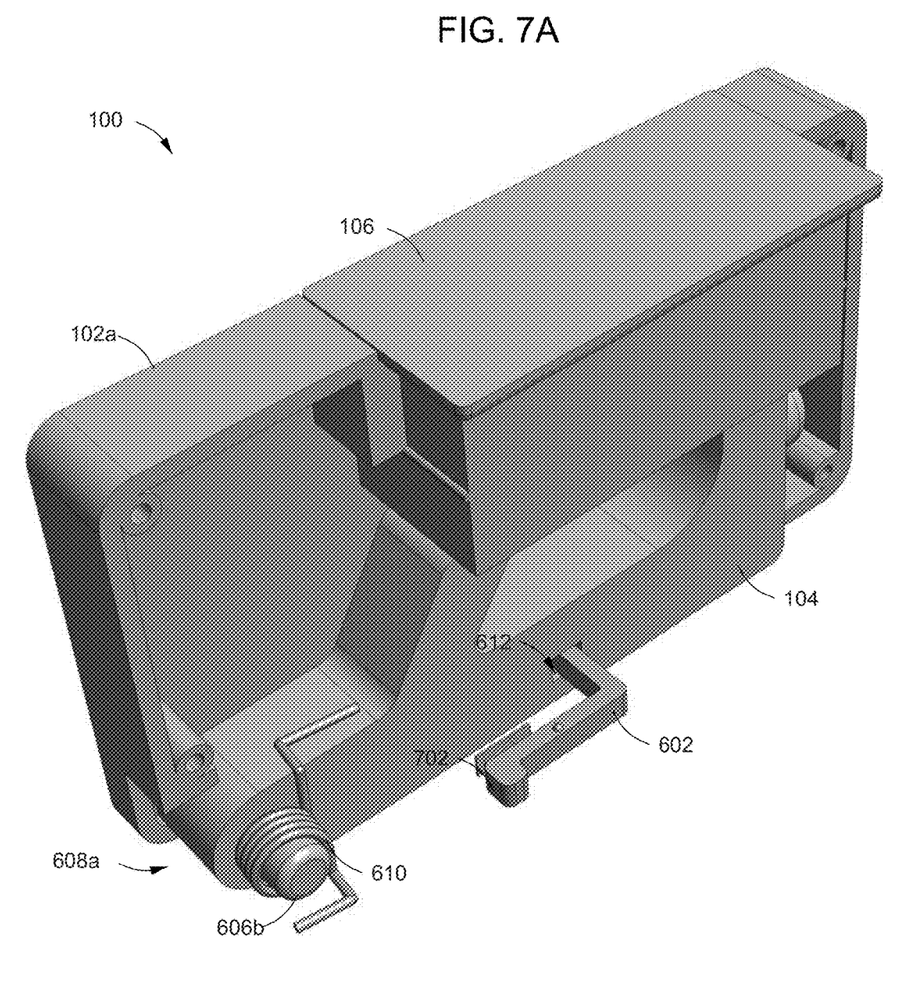
FIG. 7A illustrates a perspective view of a partially assembled sanitary tool having a rotatable arm disposed in a locked position.
Figure 7B:
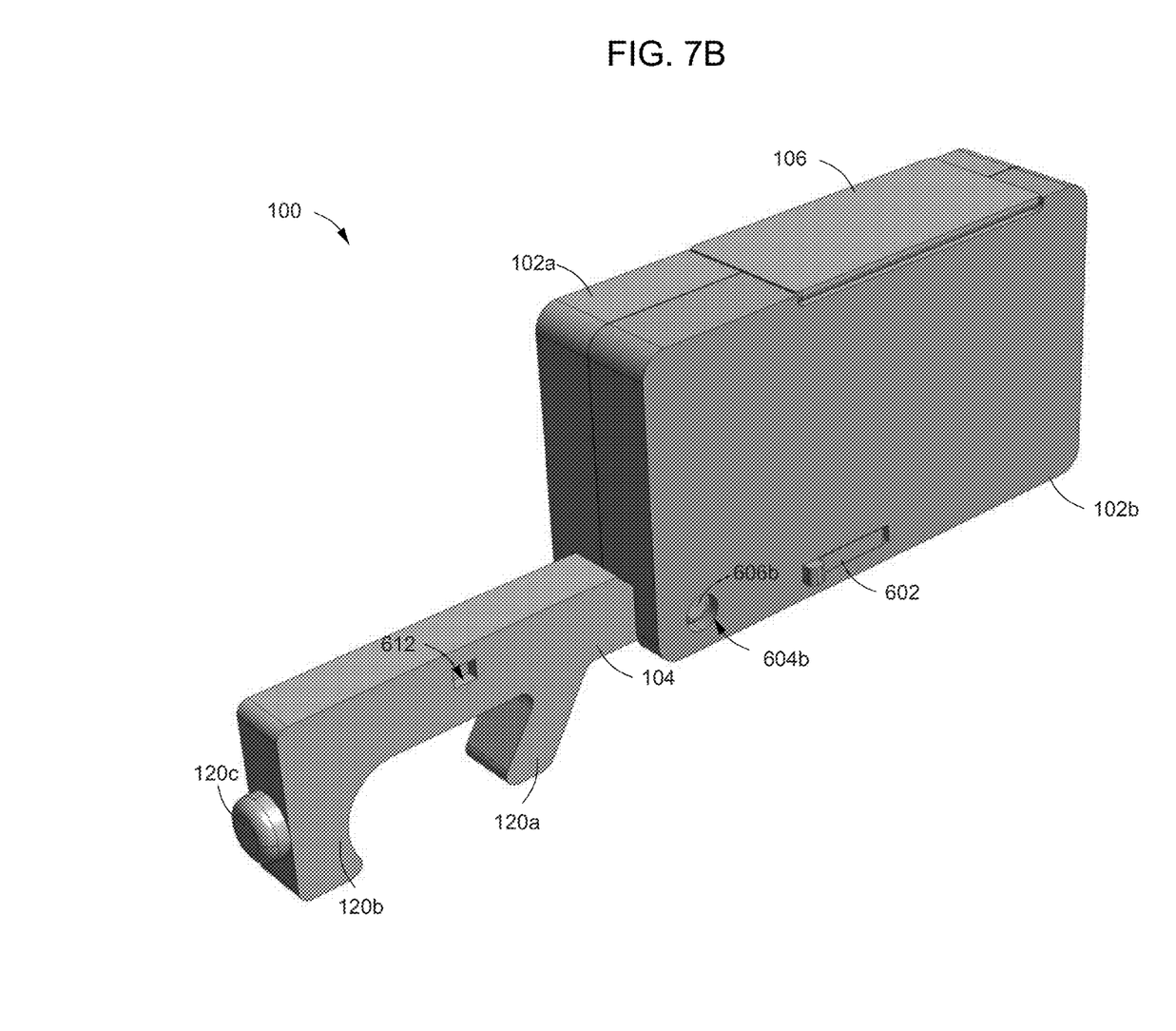
FIG. 7B illustrates a perspective view of an assembled sanitary tool having a rotatable arm disposed in an unlocked position.

FIG. 6 illustrates a perspective exploded view of a sanitary tool 100 having a rotatable arm 104. FIG. 7A illustrates a perspective view of a partially assembled sanitary tool 100 having a rotatable arm 104 disposed in a locked position. FIG. 7B illustrates a perspective view of an assembled sanitary tool 100 having a rotatable arm 104 disposed in an unlocked position.

Referring to FIG. 6 and FIGS. 7A-B, a sanitary tool 100 includes a first housing portion 102a and a second housing portion 102b, an arm 104, a cartridge 106, and a latch 602. The first housing portion 102a and the second housing portion 102b are configured, sized, and/or shaped to be mirrors of each other. Thus, the first housing portion 102a and the second housing portion 102b may be coupled, e.g., via screws, to each to form a housing 202 that is bilaterally symmetrical (see FIG. 7B).

Each housing portion 102 has a rectangular base 108 and a sidewall 110 extending from the base 108. The base 108 is planar. The base 108 of each housing portion 102 has an aperture 604 extending therethrough. The aperture 604 is capable of receiving a shaft portion 606 extending from the arm 104. The shaft portion 606 would be rotatable, relative to the housing portion 102, when disposed in the aperture 604. Accordingly, the arm 104 is said to be rotatably coupled to the housing portion 102 when the shaft portion 604 is disposed in the aperture 604.

Each base 108 has a sidewall 110 extending perpendicular to the base 108. The sidewall 110 has an arm opening 608. The arm 104 is capable of ingress or egress, or both, through the arm opening 608.

Furthermore, the arm 104 is capable of being rotated through the arm opening 608, relative to the housing portion 102. A coil 610 is capable of causing the arm 104 to rotate. The coil 608 is wound around a shaft portion 606b. A first end of the coil 610 may be abutted against a lower surface of the arm 104. A second end of the coil 610 may be abutted against an inner surface of the sidewall 110b of the housing portion 102b.

As shown in FIG. 7A, the arm 104 is retained in a locked position. Moreover, the arm 104 is retained in a locked position because a first portion of the latch 602 is disposed in an arm groove 612 of the arm 104. A second portion of the latch 602 is rotatably coupled to the housing 102b. A leaf spring 702 is disposed between second portion and the sidewall 110b (see FIG. 6), which causes the second portion of the latch 602 to be biased against the arm 104. Thus, in some cases, the latch 602 inhibits movement of the arm 104. In the locked position, the coil 610 is in tension, e.g., has a store of potential energy, which causes the arm 104 to be biased towards the arm openings 608a, 608b. When the latch 602 is removed from the arm 104, the coil 610 would convert the potential energy to kinetic energy to cause the arm 104 to rotate outwardly through the arm openings 608a, 608b (see FIG. 7B).

Additionally, the arm 104 has a first finger 120a and a second finger 120b extending from the arm 104. The first finger 120a and the second finger 120b extend obtusely relative to an axis line of the arm 104. Also, the arm has a third finger 120c extending in a direction parallel to the axis line. The third finger 120c can be removably coupled to the arm 104.

Also, the sidewall 110 of each housing portion 102 include a cartridge groove 126. The cartridge groove 126 is configured, sized, and/or shaped to receive a portion of the cartridge 106. The cartridge 106 has a base and a sidewall extending from the base. The sidewall of the cartridge 106 has protrusions 128 that may be abutted against the portions of the sidewall 110 of each of the housing portion 102 (see FIG. 3 and FIG. 6). When the protrusions 128 are abutted against the portions of the sidewall 110, in some cases, the cartridge 106 may be in inhibited from egress from the cartridge groove 126.

A sponge 130 may be disposed in the cartridge 106. One or more portions of the sponge 130 may extend from the cartridge 106. When the arm 104 is slid back or forth, one or more portions of the arm 104, e.g., fingers 120a-c, may be in physical contact with the one or portions of the sponge 130.

An operator may perform the following steps to sanitarily opening a door with a sanitary tool 100, assuming an arm 104 is disposed in a housing 202 in a sanitizing configuration. Referring to the views of FIGS. 1-5, if using a sanitary tool 100 that has a slidable arm 104, the operator may push an actuation button 122 of the arm 104 towards flaps 114 rotatably coupled to the housing 202. Pushing the actuation button 122 causes arm ribs 119a, 119b to be slid along tracks 116 of the housing 202. Moreover, pushing the actuation button 122 pushes the arm 104 against the flaps 114, causing the flaps 114 to rotate outward from flap openings 112 of the housing 202. Accordingly, fingers 120a-c would be disposed outside of the housing 202.

Referring to the views of FIG. 6 and FIGS. 7A-B, if using a sanitary tool 100 that has a rotatable arm 104, the operator may push a first latch portion of a latch 602 to uncouple a second latch portion of the latch 602 from an arm groove 612 of the arm 104. A coil 610, coupled to the arm 104, may have a first coil portion pushing the arm 104 to rotate relative to the housing 202. Accordingly, fingers 120a-c would be disposed outside of the housing 202.

Once the fingers 120a-c are exposed outside of the housing 202, the operator may position a first finger 120a adjacent a handle 402 of the door. The operator may push the handle 402 with the first finger 120a to unlatch door. If the door opens inward, the operator may push the handle 402 further with the first finger 120a to open door.

Alternatively, the operator may pull the handle 402 with a second finger 120b. If the door opens outward, the operator may pull the handle 402 further with the second finger 120b to open the door.

In case of a swinging door, the operator may push the door with the third finger 120c to open it.

Afterwards, the operator may retract the arm 104 into the housing 202, e.g., by sliding or rotating the arm 104. As the arm 104 is being retracted, the fingers 120a-c (among other portions of the arm 104 exposed outside the housing 202) may be abutted against portions of a sponge 130 of a cartridge 106. The fingers 120a-c may come into physical contact with the sponge 130. The sponge 130 may have sanitizing material, e.g., soap, alcohol, hydrogen peroxide, and/or liquid sanitizers, disposed thereon. Therefore, the sanitizing material may be deposited onto the fingers 120a-c and other portions of the arm that physically contacts the sponge 130. The sanitizing material may kill and/or inactivate germs, e.g., bacteria, fungi, and/or viruses, disposed on the arm 104.

Additionally, as the arm 104 is being retracted, knobs 502 on the arm 104 may push against flap protrusions 504 of the flaps 114, as shown in FIG. 5. As the knobs 502 move into the housing 202, the knobs 502 may push the flap protrusions 504 inward. The pushed flap protrusions 504 would cause the flaps 114 to rotate inward into flap openings 112 of the housing 202. Thus, the flaps 114 would automatically close behind the arm 104 as it retracts into the housing 202.

What is claimed as the invention is:

1. A sanitary tool, comprising:
a housing having a sidewall with an aperture;
an arm extending parallel to the sidewall and capable of ingress into or egress from the housing, or both, the arm including a finger;
a button extending through the aperture from a portion of the arm disposed in the housing; and
a cartridge removably coupled to the housing, the cartridge having a sanitizing portion capable of receiving sanitizing material and capable of being abutted against the finger of the arm.

2. The sanitary tool of claim 1, wherein the finger extends towards the sanitizing portion when the portion of the arm that includes the finger is positioned inside the housing.

3. The sanitary tool of claim 1, wherein the finger extends into and in physical contact with the sanitizing portion when the portion of the arm that includes the finger is positioned inside the housing.

4. The sanitary tool of claim 1, wherein the finger extends obtusely from the remaining portion of the arm.

5. The sanitary tool of claim 1, wherein the finger is removably coupled to the remaining portion of the arm.

6. The sanitary tool of claim 1, wherein the finger extends from an end of the arm.

7. The sanitary tool of claim 1, wherein the finger has a curved concave surface that faces the housing when the finger outside the housing.

8. The sanitary tool of claim 1, comprising two or more fingers abutted against the sanitizing portion when the fingers are inside the housing.

9. The sanitary tool of claim 1, wherein the arm comprises a button extending through the housing and capable of being slid relative to the housing.

10. The sanitary tool of claim 1, wherein the button is capable being abutted against a sidewall of the housing.

11. The sanitary tool of claim 1, wherein pushing the button pushes the finger out of the housing.

12. The sanitary tool of claim 1, wherein pushing the button pushes the finger into the housing.

13. A sanitary tool, comprising:
a housing having
an end portion;
a sidewall;
an interior;
a first aperture extending through the end portion; and
a second aperture extending through the sidewall;
a retractable arm with a distal portion including a finger and a proximate portion, wherein a portion of the arm is capable of movement through the first aperture from a first position to a second position, and wherein the distal portion is in the interior of the housing in the first position and in the exterior of the housing in the second position, wherein:

the housing is configured to receive a cartridge that comprises a sponge capable of holding sanitizing liquid, wherein the cartridge is configured to be removably inserted, from the exterior of the housing, through the second aperture towards the interior of the housing, and wherein the sponge is capable of delivering the sanitizing liquid to at least a portion of the finger when the retractable arm is in the second position.

14. The sanitary tool of claim 13, wherein the arm has a length, a height and a width, and the sponge has a sponge finger having a length that is more than the height of the arm.

15. The sanitary tool of claim 13, wherein the sponge has sponge fingers extending away from the cartridge.

16. The sanitary tool of claim 13, wherein the sponge has sponge fingers abutted against the finger of the arm when the finger is positioned inside the housing.

17. The sanitary tool of claim 13, wherein the sponge has sponge fingers in physical contact with opposing sides of the finger of the arm when the finger is positioned inside the housing.

18. The sanitary tool of claim 13, wherein the sponge has sponge fingers in physical contact with the finger of the arm when the finger is positioned inside the housing.

19. The sanitary tool of claim 13, wherein the sponge has sponge fingers capable of receiving sanitizing fluid disposed in the cartridge.

20. A sanitary tool, comprising:
a housing;
an arm capable of ingress into or egress from the housing, or both;
a coil capable of pushing the arm;
a latch, comprising:
a first portion disposed inside the housing and abutted against the arm; and
a second portion disposed outside of the housing, wherein pushing the second portion towards the housing moves the first portion away from the arm; and
a cartridge removably coupled to the housing, the cartridge having a sanitizing portion capable of receiving sanitizing material and capable of being abutted against a portion of the arm.

21. The sanitary tool of claim 20, wherein the coil is capable of rotating the arm relative to the housing.

22. The sanitary tool of claim 20, further comprising a spring disposed between the second portion of the latch and the housing.

23. The sanitary tool of claim 20, further comprising a spring pushing the first portion of the latch against the arm.

24. A sanitary tool, comprising:
a housing having a track disposed therein;
an arm configured for alternating movement into and out of the housing;
a rib protruding from the arm and abutted against the track;
a finger extending from the arm; and
a cartridge removably coupled to the inside of the housing, the cartridge including a sponge capable of receiving sanitizing material and capable of being abutted against the finger when the arm is slid on the track.

25. The sanitary tool of claim 24, wherein the track protrudes from a side of the housing.

26. The sanitary tool of claim 24, wherein the track extends from a side of the housing towards the rib.

27. The sanitary tool of claim 24, wherein the track is parallel with the rib.

28. The sanitary tool of claim 24, wherein the track comprises a first track rib and a second track rib, wherein the rib of the arm is disposed between the fist track rib and the second track rib.

* * * * *